United States Patent Office 3,410,272
Patented Nov. 12, 1968

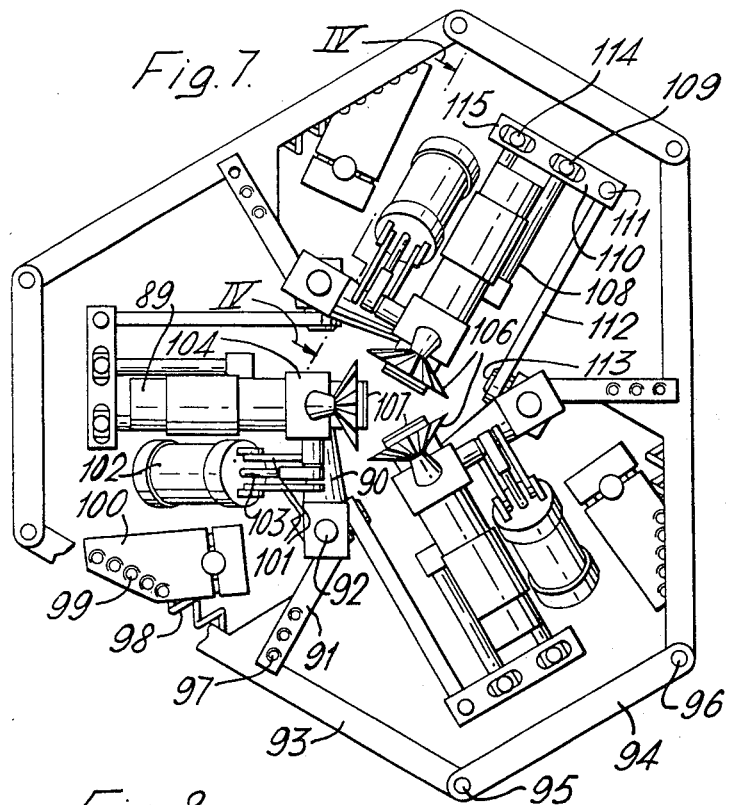

3,410,272
APPARATUS FOR REMOVING SPROUTS FROM A BRUSSELS SPROUTS PLANT
Nico Jacobus August van den Hemel, Zevenaar, Netherlands, assignor to Unilever N.V., Rotterdam, Netherlands, a company of the Netherlands
Filed July 25, 1966, Ser. No. 567,589
Claims priority, application Netherlands, July 30, 1965, 6509872; June 13, 1966, 6608143
12 Claims. (Cl. 130—30)

The invention relates to an apparatus for treating vegetable plants and more particularly for cutting the sprouts from a Brussels sprout plant. One form of such an apparatus has been proposed comprising a rotating stripping-trimming head with a central passage, along the axis of rotation of which the stalk of the plant can be passed, and a number of stripper-trimmer assemblies movable towards and away from the axis of rotation of said head for cutting the sprouts from their butts i.e. the small lengths by which they are attached to the main stalk of the plant, and for cutting the butts from the stalk, the centrifugal force acting on the stripper-trimmer assemblies during the operation of the apparatus being counteracted for example by springs.

In another form by a somewhat similar arrangement sprouts are cut from the plant without trimming the butts from the sprouts.

The object of the invention is to provide an improved apparatus of the above kind which may be in either of the above forms.

According to the invention there is provided apparatus for removing sprouts from a Brussels sprouts plant, comprising a cutting head which is rotatable about a central axis along which the stalk of the plant can be passed and which includes a plurality of cutting assemblies movable towards and away from said central axis of rotation for cutting sprouts from the plant stalk, each cutting assembly comprising a rotary cutter which is arranged to rotate about an axis extending radially from said central axis. By this measure the cutting effect of the cutting assembly is increased and less wear of the cutters tends to occur after treating a given number of sprout plants, as compared with known apparatus. Such an apparatus is particularly suitable for the combined stripping and trimming of sprouts but may in some circumstances be used for stripping without trimming.

Preferably each of the trimming cutters is in the form of a conical milling trimmer, the base of which faces the axis of rotation of the cutting head. In this way very robust cutters are obtained, which can be used to strip and trim the sprouts.

According to one embodiment of the invention each of the rotary cutters is rotated by means of a bevelled pinion riding, on rotation of the stripping-trimming head, over a bevelled gear wheel, forming part of a stationary plate having a feed opening coaxial with the passage of the head.

Preferably, however, each of the trimming cutters is provided with a separate driving motor, which may be pneumatic. In this way the speed of rotation of the cutters is independent of the speed of rotation of the cutting head.

Each rotary cutter may comprise an axial distance piece having a cutter-rim which preferably has a milled edge and which is arranged to rest against the stalk of a sprout plant as it passes through the stripping-trimming head and to cut sprout butts from the plant stalk. In this way the central parts of the cutter-rims function as feelers, which center the stalk of the sprouts plants during its treatment. It is preferable that each cutter-rim has a rounded end which rests against the stalk of the plant. This measure prevents the cutter-rim from biting into the stalk.

According to a preferred embodiment of the invention the radial movements of the cutting assemblies are mutually coupled by a linkage. This measure ensures that the relative positions of the cutting assemblies with respect to the cutter head are mutually equal, which promotes centering of the stalk.

In particular the mechanical linkage may include counterweights and springs which ensure that the rotary cutters are urged radially inwards with a pressure which is independent of their distance from said central axis of the cutting head.

The free end of the shaft of each cutter may be journalled in a ring connected to a lost-motion-joint with a first arm of a three-arm lever appertaining to said cutter and mounted for rotation on a pin carried by the cutting head parallel to its axis of rotation, the second arm of said lever being hingedly connected by means of a bar with an arm of the subsequent three-armed lever, which latter arm corresponds with the third arm of the former three-armed lever. If, according to the invention, care is taken that the second arm of the three-armed lever is paralleled and equal to the third arm of the subsequent three-armed lever and that the second arm of each three-armed lever carries a centrifugal weight assisting the action of the springs counteracting the centrifugal force acting on the stripper-trimmer assemblies, a suitable adjustment of the centrifugal weights to said springs can ensure that the pressure exerted by the stripping cutters on the stalk of the sprouts plant at a given speed of rotation of the cutting head is similar with each relative radial position of the cutting assemblies with respect to the cutting head.

According to another embodiment of the invention each stripper-trimmer assembly can pivot around the shaft guide by the stripping-trimming head and parallel to the axis of rotation thereof.

Preferably each stripper-trimmer assembly is carried by a lever pivoted to the stripping-trimming head, the ends of said levers beyond their pivots being mutually connected.

The ends of the levers carrying the stripper-trimmer assemblies may be mutually connected by means of a ring concentric with the axis of rotation of the stripping-trimming head, said ring being rotatable around its axis. Each stripper-trimmer assembly can in a suitable manner be pivoted away from the axis of rotation of the stripping-trimming head, by means of an air cylinder.

According to a third embodiment of the invention each stripper-trimmer assembly is pivoted to the lever carrying said assembly so as to be rotatable in an axial plane of the stripping-trimming head, the position of the assembly in said plane being determined by an air cylinder.

As will be apparent, in any of the above embodiments the radial position of the rotary cutters may be controlled by air cylinders and this gives flexibility of control.

Since it has been found in practice that there exists a certain relationship between the butt lengths and the diameter of the stalk of a sprout plant, it is advisable that the radial distance between the stripping cutters and the axis of rotation of the cutting head is always proportional to the radial distance between the trimming cutters and said axis. To this end each of the stripping cutters may be carried at the end of a lever carried by the stripping-trimming head pivotally around an axis parallel with the axis of rotation of said head, the part of the lever beyond its pivot following the movement of the ring constituting the linkage which mutually couples the cutting assemblies. It is, however, also possible to reach this object when each of the stripping cutters is carried at the end of a Z-shaped lever slidable in the longitudinal direction of the corresponding driving motor of the trimming cutters in the bracket carrying said motor, the other end of the Z-shaped lever being connected by means of a pin and groove with an arm pivoted to the cutting head so as to pivot around an axis parallel with the axis of rotation of said head, said motor being also connected to said arm by means of a pin and groove. The arm to which a Z-shaped lever and a driving motor are each connected by means of a pin and groove may be linked to the end of another arm, the other end of which can rotate around an axis which coincides with the axis parallel to the plane of the cutting head and around which the cutting assembly can be rotated by an air cylinder.

Another feature of the invention is that the rotary cutters may be pivoted so as to enable them to be pivoted from a cutting position to a position where they provide a funnel shaped opening for introduction of a plant stalk into the apparatus.

The invention will now be described in more detail with reference to the accompanying drawing, showing 3 different embodiments of the invention:

FIG. 7 is a top view of a third embodiment, also in this case the stationary front plate containing the feeding opening having been removed for the sake of clearness;

FIG. 8 is a section along line VIII—VIII of FIG. 7;

FIG. 9 is a view corresponding to FIG. 8, showing the stripper-trimmer assembly in a different position.

Figure 1:
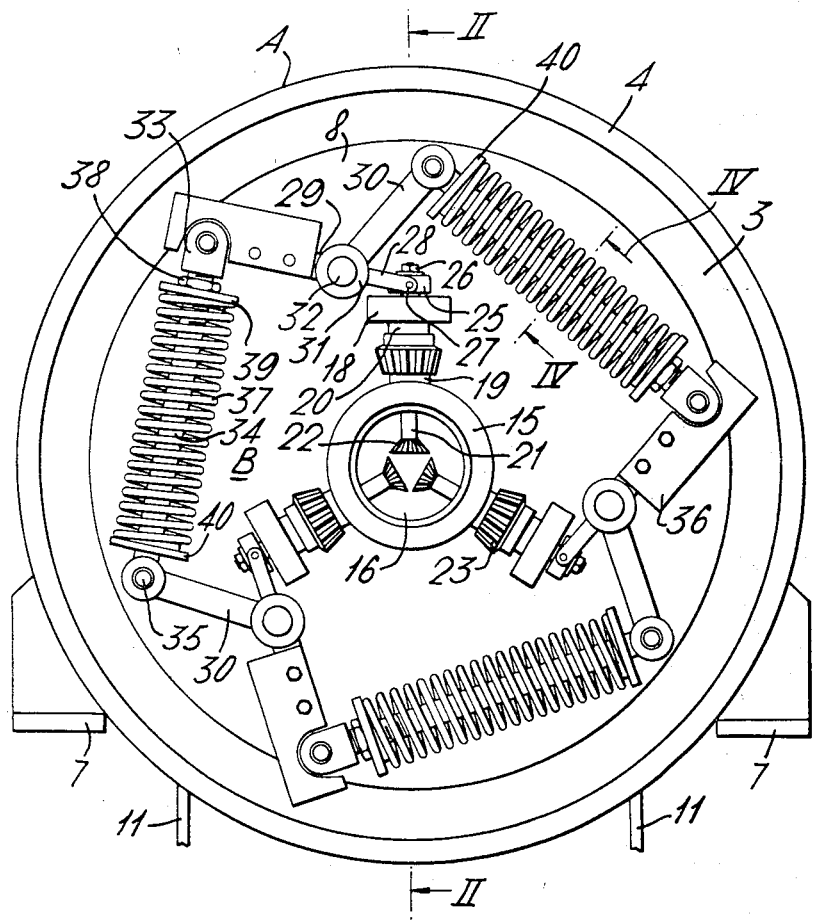
FIG. 1 is a front elevation of the first embodiment, the stationary front plate containing the feeding opening having been removed for the sake of clearness.

The embodiment of the apparatus shown in FIGURES 1–4, has a stationary frame A, which is composed of a front plate 1 with a central feeding opening 2, and a parallel back plate 3, which plates are mutually connected by means of an annular plate 4. The back plate 3 has an opening in which is mounted a cylindrical part 5, functioning as outer race of a roller bearing formed by frame A and a stripping-trimming head B (FIG. 1) journalled in said frame. Frame A is provided with a number of stiffening ribs 7 (FIG. 1), as well as with supports, with which the apparatus can be mounted on a fixed frame.

Figure 2:
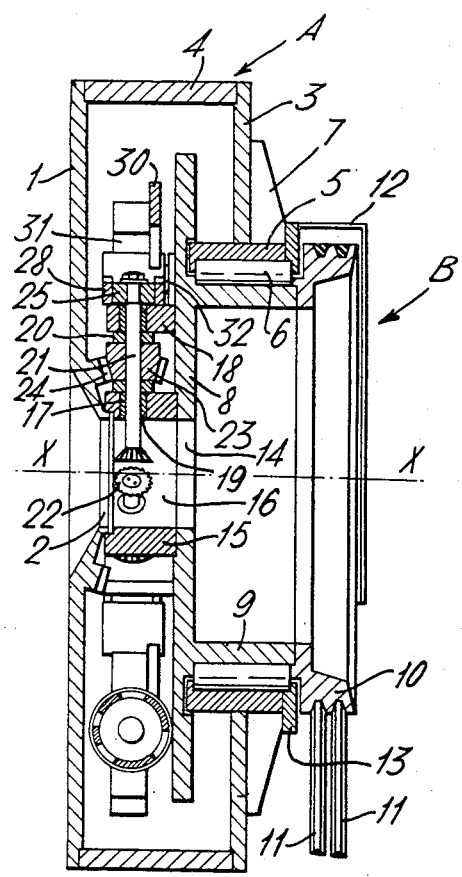
FIG. 2 is an axial section along line II—II of FIG. 1.

The stripping-trimming head B, which is capable of rotating around an axis of rotation indicated by line X—X in FIG. 2, comprises a cutter-plate 8, to which a drum 9, functioning as inner race, is fixed.

The drum 9 carries an annular V-belt pulley 10 with V-belts 11, driven by a driving motor (not shown).

By reference numeral 12 a protective hood is indicated carried by an end plate 13 mounted on the frame A.

The cutter-plate 8 is provided with a central passage 14 and carries a ring 15, the wall of the bore of which coincides with the wall of the passage 14, so that a central feeding channel 16 is formed, through which the plant is fed with its root end first during operation of the apparatus. The ring 15 is provided with a number of radial bores 17 (in the embodiment shown: three) in line with an equal number of brackets 18 mounted on the plate 8. By means of bearings 19 and 20 in each set of registering bores in the ring 15 and in the brackets 18, the shaft 21 of a trimming cutter 22, having the shape of a conical milling trimmer, is slidably journalled.

In the embodiment shown the trimming-means 22 are rotated by means of a bevelled pinion 23 mounted slidably on the shaft 21 by means of a key-joint and riding on rotation of the stripping-trimming head over bevelled gear wheel 24 of the front plate 1.

Each shaft 21 carries at its end a free revolvable ring 25, locked by a nut 26. The ring 25 is connected by a lost-motion-joint 27 with a forked arm 28 of a three-armed lever 28, 29, 30, the arms of which are mounted on a bushing 31, hingedly fixed on the cutter-plate 8 by means of a pin 32. The end of each arm 29 is hingedly connected to a fork 33, carried by a bar 34, the other end of said bar being connected by means of a hinge 35 to the end of the arm 30 of the adjacent three-armed lever 28, 29, 30. Owing to this mutual coupling of the stripper-trimmer assemblies their relative position in radial direction with respect to the stripping-trimming head is always equal.

Figure 4:
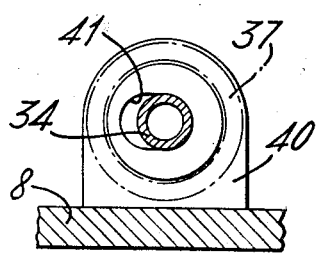
FIG. 4 is a section along line IV—IV of FIG. 1 on an enlarged scale.

Each arm 29 carries a centrifugal weight 36 and around each bar 34 a spring 37 is arranged, resting at one end against a plate 39 adjustably carried by the bar 34 by means of a nut 38. The other end of spring 37 rests against a support 40, fixed to the cutter-plate 8 (FIG. 4). The bar 34 extends through an oblong opening 41 of the support 40, so that this opening cannot hamper relative movements of the bar 34 with respect to the plate 8.

When the stripping-trimming head B does not rotate, the springs 37 will bring the stripper-trimmer assemblies 22 into their extreme inward radial position. This position is shown in FIG. 1. Since in this position the arm 30 of a bushing 31 and the arm 29 of a subsequent bushing 31 are perpendicular to the line connecting these two bushings 31, and since the arms 29 and 30 are of the same length, in this position of the stripper-trimmer assemblies neither the centrifugal forces acting on the arms 29 and 30, nor the centrifugal forces acting on the parts mounted on these arms, with the exception of the centrifugal forces acting on the centrifugal weights 36, will exert a torque on the bushings 31 on rotation of stripping-trimming head B. On rotation of the stripping-trimming head B the clockwise torque (FIG. 1), exerted by the springs 37 on each of the bushings 31 will at first be assisted only by the centrifugal forces acting on the centrifugal weights 36 and be counteracted by the centrifugal forces acting on the parts 22, 21, 25 and 28. If the stripper-trimmer assemblies shift outward from the position shown, the clockwise torque acting on the bushings 31 will also be assisted by the centrifugal forces acting on the parts connecting these arms.

Because the influence of the centrifugal forces acting on the assembly of the parts 22, 21, 25 and 28 increases relatively when the stripper-trimmer assemblies move outward, since these parts then generate circles having a larger diameter, whereas the influence of the centrifugal forces which try to rotate the bushings 31 in a clockwise direction decreases relatively, since these parts then generate circles having a smaller diameter, it is possible to achieve by suitable dimensioning of the springs 37 and of the centrifugal weights 36 that at a certain speed of rotation of the stripping-trimming head B the ultimate clockwise torque acting on the busings 31 and trying to rotate the stripper-trimmer assemblies inward is constant at any relative radial position of the stripper-trimmer assemblies with respect to the stripping-trimming head B. In other words: the pressure exerted by the stripping-cutters on the stalk of a sprouts plant fed through the feeding channel 16 is not dependent on the diameter of this stalk, but solely on the speed of rotation of the stripping and trimming head B. If the speed of rotation of the stripping-trimming head is increased, the ultimate torque acting on the bushings 31 will reverse its direction, so that the stripper-trimmer assemblies then shift to their extreme outward position.

Figure 3:
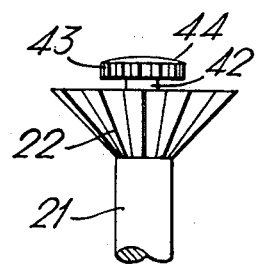
FIG. 3 shows on an enlarged scale a detail of one of the stripping and trimming cutters.

As is shown in FIG. 3, each trimming cutter 22 carries at its base an axial distance piece consisting of a cutter-rim 43 for cutting the butts of the sprouts from their stalk, and carried by a cylindrical part 42. The outer surface of the distance piece has the shape of a spherical cap 44, which rests against the stalk of the plant and prevents the cutter-rim 43 from biting into the stalk.

On treating a sprouts plant with the embodiment described, the stripping-trimming head B is first driven with such a speed that the stripper-trimmer assemblies assume their outermost position. Subsequently, a sprouts plant is fed with its root end first into the feeding channel 16 and the speed of rotation of the stripping-trimming head B is reduced to a specific constant value, independent of the diameter of the stalk, at which speed the spherical cap 44 rest against the stalk with the desired pressure. The sprouts plant is then passed through the feeding channel 16 while the trimming cutters 22 cut the sprouts from their butts and the stripping cutters 43 subsequently remove the butts from the stalk, so that the trimming cutters 22 always keep working at the same distance from the stalk. The stalk is then discharged (to the right, in FIG. 2), whereas the cut-off sprouts fall into the drum 9 and are subsequently discharged through the annular V-belt pulley 10.

Figure 5:
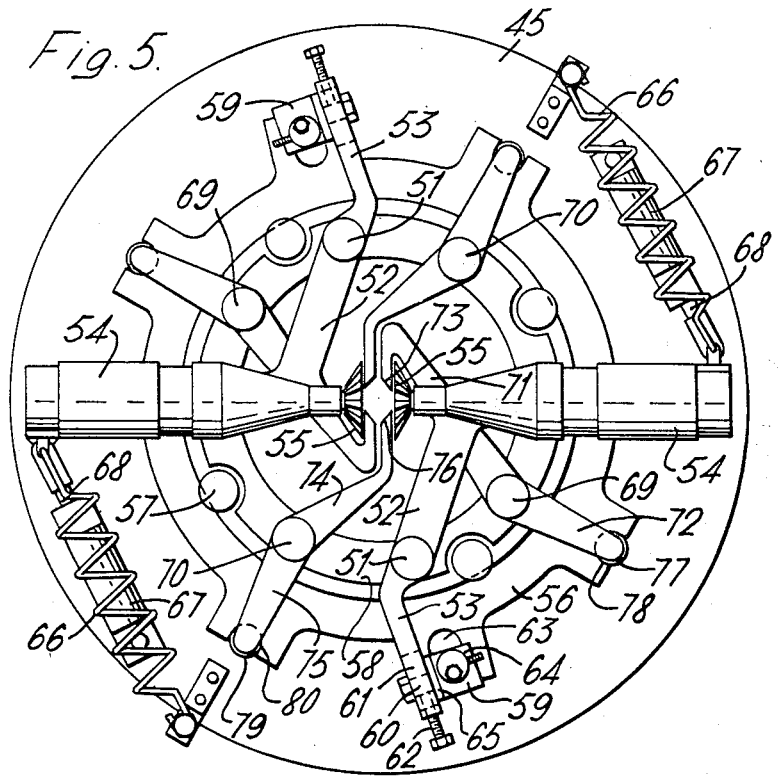
FIG. 5 is a top view of a second embodiment, the stationary front plate containing the feeding opening having been removed also in this case for the sake of clearness.
Figure 6:
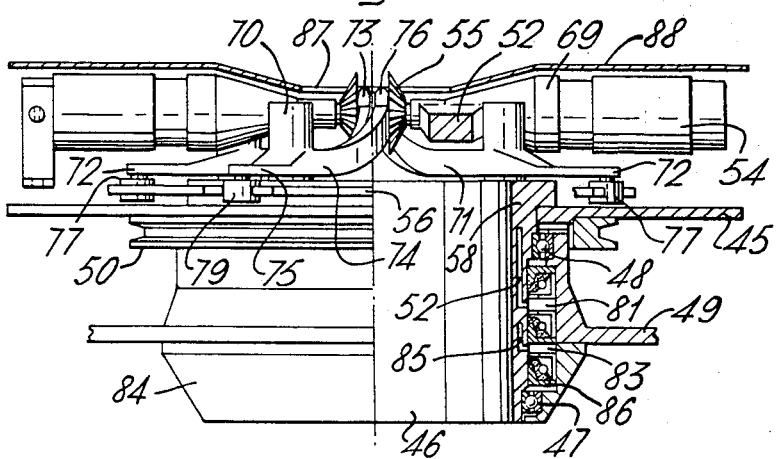
FIG. 6 is a side elevation, partially in section of the embodiment shown in FIG. 5.

In the embodiment shown in FIGS. 5 and 6 each of the trimming-cutters is provided with a driving motor, whereas the radial movements of the stripper-trimmer assemblies are mutually coupled by a linkage.

The stripping-trimming head consists of an annular plate 45 to which the hub 46 is fixed and which is journalled in the stationary part 49 of the frame by means of roller bearings 47 and 48. The stripping-trimming head is driven by a motor (not shown) by means of a V-belt driving pulley 50 fixed to plate 45. In the flange 58 of the hub 46 are arranged two diametrically opposed pivots 51 to each of which a two-armed lever 52, 53 is hinged, the arms 52 carrying each a driving motor 54. The shaft of the driving motors 54 carries a trimming-cutter constituted by a conical milling trimmer 55.

The ends of the arms 53 of the levers 52, 53 are mutually coupled by means of a ring 56 which is coaxial with the axis of rotation of the stripping-trimming head and which is rotatably journalled by means of rollers 57 to the head. The arms 53 are linked to ring 56 by means of an angle iron 59 of which the flange 65 is adjustably connected to the arm 53 by means of a bolt 60 extending through a groove 61 of the arm and which can be located in the groove 61 by means of an adjusting bolt 62. Angle iron 59 carries a roller which fits in a groove 63 of ring 56 and to the shaft of which an eccentric 64 is fixed which bears against flange 65 of angle iron 59. Owing to this arrangement the relative position of ring 56 to the trimming cutters 55 can be adjusted.

A tension spring 66 fixed to plate 45 at one end and to the rear part of the driving motors 54 urges the stripper-trimmer assembly towards the axis of rotation of the stripping-trimming head. This action can be counteracted by means of an air cylinder 67 fixed to plate 45, the piston of which is linked to the rear end of a driving motor 54.

The flange 58 of the hub 46 of the stripping-trimming head also carries two sets of diametrically opposed pivots 69 and 70. To each of the pivots 69 is hinged a two-armed lever 71, 72. The end of arm 71 carries a stripping-cutter 73 and the end of arm 72 carries a roller 77 which fits in a groove 78 of ring 56. In a similar way a two-armed lever 74, 75 is hinged to each of the pivots 70. The end of arm 74 carries an identical stripping-cutter 76 and the end of arm 75 carries a roller 79 which fits in a groove 80 of ring 56. In this manner the trimming cutters 55 follow the movements of the stripping-cutters 73 and 76 in such a manner that the distance between the trimming cutters 55 and the axis of rotation of the stripping-trimming head is always proportional to the distance between the stripping cutters 73, 76 to said axis, which results in that the sprouts are always cut at the desired location from their butts.

The driving motors 44 are pneumatic motors which are fed via conducts 82 in the flange 58 of the hub 46, which conducts in open connection with a circular groove 81 in the stationary part of the frame which is connected to a source of compressed air. The air cylinders 67 are fed with compressed air via conducts 85 which are in open connection with a groove 83 in a conical part 84 of the stationary frame. The grooves 81 and 83 are sealed by sealing rings 86. Reference numeral 88 indicates a front plate of the head provided with a feeding opening 87.

When a new stalk is to be fed to the machine compressed air is admitted to the air cylinders 67 resulting in that the stripper-trimmer assemblies move away from the axis of rotation of the head so that a new stalk can be inserted in the central opening so formed. When the supply of compressed air to cylinders 67 is diminished or cut off, springs 66 move the stripper-trimmer assemblies so far inward, that the stripper cutters 73, 76 rest against the stalk of the plants. When the stalk is moved through the apparatus the trimming cutters 55 cut the sprouts from the butts and the stripping cutters 73, 76 cut the butts from the stalk.

The stripping-trimming head of the third embodiment of the invention shown in FIGURES 7-9 has three driving motors 89 for the trimming cutters 106. Driving motors 89 are mounted in a bracket 104 which can pivot around arm 90 of a two-armed lever 90, 91. This lever itself is hinged to a pivot 92 carried by the head. The radial movement of the stripper-trimmer assemblies is mutually coupled by means of a linkage comprising the links 93 and 94 which are hinged to each other at 95 and 96 to the links 93 of which the arms 91 are bolted by means of bolts 97. Tension springs 98 connected to links 93 and to a bolt 99 in bracket 100 urge the stripper-trimmer assemblies towards the axis of rotation of the stripping-trimming head. Bracket 100 is fixed to the base plate of said head.

Each of the driving motors 89 is provided with an air cylinder 102 fixed by means of arms 101 to arm 90 of the two-armed lever 90, 91. The piston rod 103 of this air cylinder is hingedly connected to the bracket 104 carrying the motor, so that on activation of the air cylinder 102 it tilts the motors 89 into a position shown in FIG. 8 in which the longitudinal axis of the driving motors 89 is at right angles to the axis of rotation Y—Y of the stripping-trimming head. A spring (not shown) tilts the stripper-trimmer assembly into the position shown in FIG. 9 when the supply of compressed air to cylinder 102 is cut off.

The stripping cutter 107 of each of the stripper-trimmer assemblies is carried by the end of a Z-shaped lever 108 which is slidably carried by brackets 104 so that it can slide in the direction of the longitudinal axis of motor 89. The other end of said Z-shaped lever 108 is connected to an arm 110 by means of a pin and groove 109. One end of arm 109 is pivoted at 111 to the end of arm 112, pivoted at 113 to the subsequent pivot 92. The axis around which arm 112 can pivot coincides with the axis around which the trimmer-stripper assembly can pivot around arm 90. The rear end of each driving motor 89 is fixed by means of a pin 114 and a groove 115 to the other end of arm 110, so that on movement of the stripper-trimmer assembly around pivot 92 the distance between the stripping cutters 107 and the axis of rotation of the stripping-trimming head is always proportional to the distance between the trimming cutters 106 and said axis. Owing to the construction described the parts carrying the stripping cutters 107 can follow the movements of the driving motors 89 when they are tilted by the air cylinders 102. The pneumatic motors 89 and the air cylinders 102 are fed with compressed air in the same manner as has been shown with reference to the embodiments of FIGURES 5 and 6.

When a new Brussels sprouts plant is to be fed to the apparatus shown in FIGURES 7-9, the trimmer-stripper assemblies are tilted into the position shown in FIG. 9. When the end of the plant has been fed in the funnel-shaped opening formed by the stripper-trimmer assemblies, the air cylinders 102 are activated so that the stripper-trimmer assemblies assume the position shown in FIG. 8, in which the stripper cutter 107 rests against the stalk of the plant.

What is claimed is:

1. Apparatus for removing sprouts from a Brussels sprouts plant, comprising a cutting head which is rotatable about a central axis along which the stalk of the plant can be passed and which includes a plurality of cutting assemblies movable towards and away from said central axis of rotation for cutting sprouts from the plant stalk, each cutting assembly comprising a rotary cutter which is arranged to rotate about an axis extending radially from said central axis.

2. Apparatus according to claim 1, in which each of the rotary cutters is in the form of a conical milling trimmer, the base of which faces the axis of rotation of the cutting head and enables the cutter to strip and trim the sprouts.

3. Apparatus according to claim 2, in which each rotary cutter comprises an axial distance piece having a cutter rim arranged to rest against the stalk of a sprout plant as it passes through the cutting head and to cut sprout butts from the plant stalk.

4. An apparatus according to claim 3 in which the cutter rim has a milled edge.

5. Apparatus as claimed in claim 3, in which the cutter-rim has a rounded end which rests against the stalk of the plant.

6. Apparatus according to claim 1, in which each of the rotary cutters is rotated by means of a bevelled pinion riding, on rotation of the cutting head, over a bevelled gear wheel forming part of a stationary plate having a feed opening coaxial with the central axis of the head.

7. Apparatus according to claim 1, in which each of the rotary cutters is provided with a separate driving motor.

8. An apparatus according to claim 7 in which each separate driving motor is a pneumatic motor.

9. An apparatus according to claim 7 in which separate stripping and trimming cutters are provided and the radial distance between the stripping cutters and said central axis varies in proportion to the radial distance between the trimming cutters and said central axis.

10. An apparatus according to claim 7 in which the radial position of the rotary cutters is controlled by air cylinders.

11. An apparatus according to claim 10 in which the rotary cutters are pivoted so as to enable them to be pivoted from a cutting position to a position where they provide a funnel shaped opening for introduction of a plant stalk into the apparatus.

12. Apparatus according to claim 1 comprising a mechanical linkage including counterweights and springs which ensure that the rotary cutters are urged radially inwards with a pressure which is independent of their distance from said central axis of the cutting head.

References Cited

UNITED STATES PATENTS

| | | | |
|---|---|---|---|
| 2,951,485 | 9/1960 | Cover | 130—9 |
| 3,131,699 | 5/1964 | Cover et al. | 130—9 |
| 3,175,561 | 3/1965 | Oldershaw | 130—30 |

ANTONIO F. GUIDA, *Primary Examiner.*